United States Patent [19]

Roden et al.

[11] 4,150,775
[45] * Apr. 24, 1979

[54] WELDING BACK-UP TAPE

[75] Inventors: William A. Roden, Rancho Santa Fe; Glenn L. Criger, San Diego, both of Calif.

[73] Assignee: General Dynamics Corporation, San Diego, Calif.

[*] Notice: The portion of the term of this patent subsequent to Sep. 20, 1994, has been disclaimed.

[21] Appl. No.: 817,635

[22] Filed: Jul. 21, 1977

Related U.S. Application Data

[63] Continuation-in-part of Ser. No. 689,416, May 24, 1976, Pat. No. 4,049,183.

[51] Int. Cl.² .............................................. B23K 9/02
[52] U.S. Cl. ..................... 228/50; 156/191
[58] Field of Search ................... 228/50, 216; 156/191

[56] References Cited

U.S. PATENT DOCUMENTS

| | | |
|---|---|---|
| 2,362,505 | 11/1944 | Smith ..................................... 228/50 |
| 3,001,057 | 9/1961 | Hackman et al. ............... 228/216 X |
| 3,365,566 | 1/1968 | Kuder ............... 228/216 X |
| 3,494,020 | 2/1970 | Cornell ................................. 228/216 |
| 4,049,183 | 9/1977 | Roden et al. ........................ 228/50 |

Primary Examiner—Al Lawrence Smith
Assistant Examiner—K. J. Ramsey
Attorney, Agent, or Firm—John R. Duncan

[57] ABSTRACT

An improved back-up tape for use in fusion welding metal sheets and structures is disclosed. The tape comprises a rolled refractory fiber fabric partially flattened against an adhesive coated surface of a wider, heat resistant, strip. In use, the tape is pressed against the back side of a joint or other weld line to be welded with the adhesive bonding the tape along strips parallel to but slightly spaced from the weld line and the roll pressed against the joint. Fusion welding is conducted without the addition of any filler wire. A flat weld underbead, with no molten metal drop-through is produced, with no melting or other significant change in the tape. The tape is then stripped off and the welded structure is ready for use.

9 Claims, 2 Drawing Figures

WELDING BACK-UP TAPE

CROSS REFERENCE TO RELATED CO-PENDING APPLICATION

This application is a continuation-in-part of our co-pending U.S. Patent Application, Ser. No. 689,416, filed May 24, 1976 now U.S. Pat. No. 4,049,183.

BACKGROUND OF THE INVENTION

This invention relates in general to the welding of aluminum and similar materials and, more specifically, to an improved back-up tape for use in such welding.

In butt welding thin sheets or structures together, a number of problems may be encountered. Welding such structures without support along the weld line opposite the welding head is generally unsatisfactory. Molten metal from the weld zone tends to drop through, leaving voids along the weld line. Also, the underside of the weld tends to be uneven, with droplet-like projections.

Attempts have been made to support weld lines with solid structures, which, while useful in some cases, are not adaptable to a variety of structure and sheet shapes. Tape-like support means of various kinds have also been used, adhesively bonded along the weld line. The surfaces of some back-up tapes are intended to fuse during the welding operation, and may include a surface layer of a flux. This type tape is undesirable in high quality aerospace-type applications where the weld must be free of contamination.

Other commercial tapes, while satisfactory for rough work or where the weld bead is to be finish machined, do not provide adequate support to produce highly uniform, smooth weld beads. In some cases, local failure of the tape from thermal weakening or melting will permit drop through of the fused metal, leaving insufficient metal to form a satisfactory bead, especially where no metal is added during welding.

In order to provide sufficient support, many tapes require a rigid back-up plate pressing the tape against the weld underbead. In welding complex structures, such as long tubes, it is inconvenient to attempt to hold the tape in place with a solid member. Since the solid backing member must conform to the surface being welded, a special backing member must be built for each structure design being welded.

Other backing strips or tapes may include a metal or solid refractory strip to provide rigid support. These tapes are complex, heavy, difficult to install and will conform to curved weld surfaces of only large radii of curvature.

Thus, there is a continuing need for improved welding back-up tapes especially for use in welding aluminum to high quality standards.

OBJECTS OF THE INVENTION

An object, therefore, of this invention is to provide a welding back-up tape overcoming the above-noted problems.

Another object of this invention is to provide a welding back-up tape of improved simplicity, reliability and versatility.

A further object of this invention is to provide a welding back-up tape capable of producing a smooth, contamination-free, underbead in fusion welded aluminum and similar metals.

SUMMARY OF THE INVENTION

The above objects, and others, are accomplished in accordance with this invention, by a welding back-up tape comprising an elongated strip having an adhesive coating on one side and a roll of refractory fiber fabric in contact with the adhesive coating and aligned with the longitudinal centerline of the strip. When pressed against the strip, the roll partially flattens, leaving an adhesive margin along both edges of the roll.

In use, the tape is pressed against the underside of the weld line, with the roll aligned with the weld line and the adhesive margins removably bonding the tape assembly to the structure being welded. During welding, the roll exerts a substantially uniform pressure across the weld line, producing a very flat underbead. The roll material is not fused during welding, so that support is maintained and weld metal drop-through and weld contamination are prevented. After welding, the tape is stripped away, leaving a clean, uniform and uncontaminated surface.

BRIEF DESCRIPTION OF THE DRAWING

Details of the invention, and of a preferred embodiment thereof, will be further understood upon reference to the drawing, wherein.

DETAILED DESCRIPTION OF THE INVENTION

Figure 1:
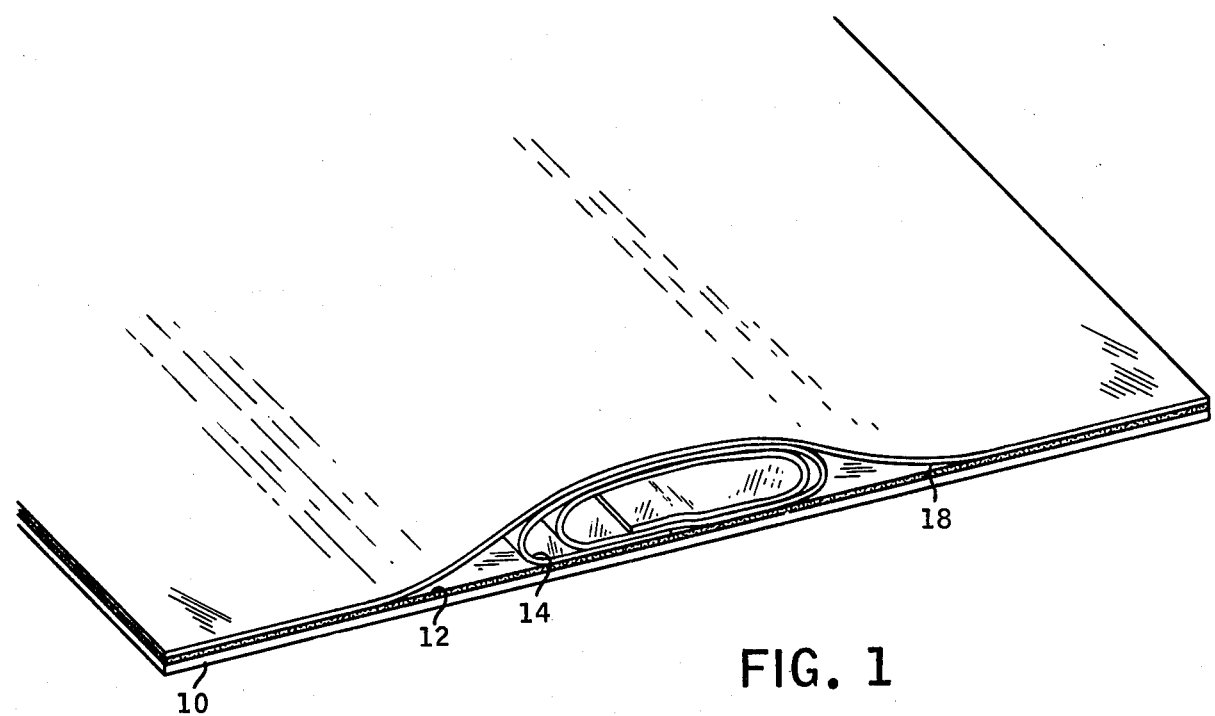
FIG. 1 is a perspective view of the welding back-up tape, partly cut-away for clarity.

Referring now to FIG. 1 there is seen a perspective view of a welding back-up tape, partly cut-away for clarity. The tape comprises an elongated strip 10 having an adhesive coating 12 on one side. A roll of refractory fiber fabric is bonded to adhesive coating 12 substantially along the center line of strip 10. To permit the assembled tape to be easily handled, a cover sheet 18 is placed over the tape in contact with the adhesive margins adjacent to sleeve 14. Cover sheet 18 is stripped away just before the tape is used.

Strip 10 may comprise any suitable material. Typical materials include refractory fiber fabric (such as woven fiberglass or quartz fiber fabrics) metal foil, high temperature resistant plastics and combinations thereof. Best results are generally obtained with woven refractory fiber fabric strips, since they are flexible and easily conform to complex shapes and resist welding temperatures without degradation. If desired, other coatings, such as a thin aluminum layer, may be applied to either surface of strip 10 to enhance the high temperature or other characteristics of the strip. Strip 10 may have any suitable dimensions. Generally a thickness of from about 0.003 to 0.010 inch and a width of from about 1 to 3 inches give good results. The length may be indefinite, since the tape may be coiled and portions cut off as needed. For the usual welding of aluminum structures, optimum results are obtained with fiberglass tapes having widths in the about 2 to 3 inch range.

Any suitable adhesive may be used in forming coating 12 on strip 10. Typical adhesives include tacky pressure sensitive coatings, heat activated adhesives, water or solvent activated adhesives, etc. Pressure sensitive adhesives are preferred for ease and simplicity of bonding the tape to structures to be welded.

Where a pressure sensitive adhesive is used for coating 12, a cover sheet 18 is preferably used during handling and storage of the tape. Typical cover sheets include paper, cloth or plastic sheets having a surface coating, such as a silicone resin, which adheres only lightly to adhesive layer 12. Where adhesive layer is non-tacky under storage conditions but is tackified by heat, water or solvent just prior to use, cover sheet 18 may be omitted.

Roll 14 may comprise any suitable high temperature resistant non-metallic fibers that are not melted or significantly degraded at the welding temperatures. Such fibers are generally referred to as "refractory fibers". Typical roll materials include glass, quartz, and ceramic fibers and mixtures thereof. While glass fibers are preferred when welding aluminum, fibers having higher temperature resistance may be preferred when welding other metals at higher temperatures. Roll 14 may have any suitable dimensions and physical characteristics. Best results when welding aluminum are obtained with roll fabrics of continuous woven Volon glass fibers, 2 under, 2 over, 16 weaves per inch, about 0.015 inch thick and weighing about 17 grams per running meter of length, available from the Varglas Corporation. Roll 14 preferably has an outer circumference of from about 1.5 to 3.0 inches in order to provide the optimum support to the weld underbead. The ratio roll 14 circumference to strip 10 width is preferably from about 0.2 to 1.0 to give optimum support to the roll while providing optimum adhesive margins in contact with the structure being welded.

Roll 14 is formed by rolling an elongated refractory fiber fabric about an axis parallel to the longer sides of the sheet. While a single layer roll may be used, (forming a circle with the seam against adhesive 12) it is preferred that the sheet be rolled until at least two layers of fabric lie around the entire circumference of the roll. The roll is pressed against adhesive layer 12 so that the outer edge is in contact with the adhesive, as seen in FIG. 1, so as to prevent unrolling.

This back-up tape may be used in welding any suitable metal. The metal should be weldable at temperatures below the fusion temperature of the fabrics used in roll 14 and in strip 10. Typical metals include aluminum, magnesium, steel, titanium, bronze, copper-nickel, and other mixtures and alloys thereof. When the tape is used with the higher-melting metals, the roll and strip fabrics should be made from correspondingly higher melting refractory fibers, since many of the advantages of this back-up tape will be lost if fusion or other degradation of the fiber roll is allowed to occur.

Figure 2:
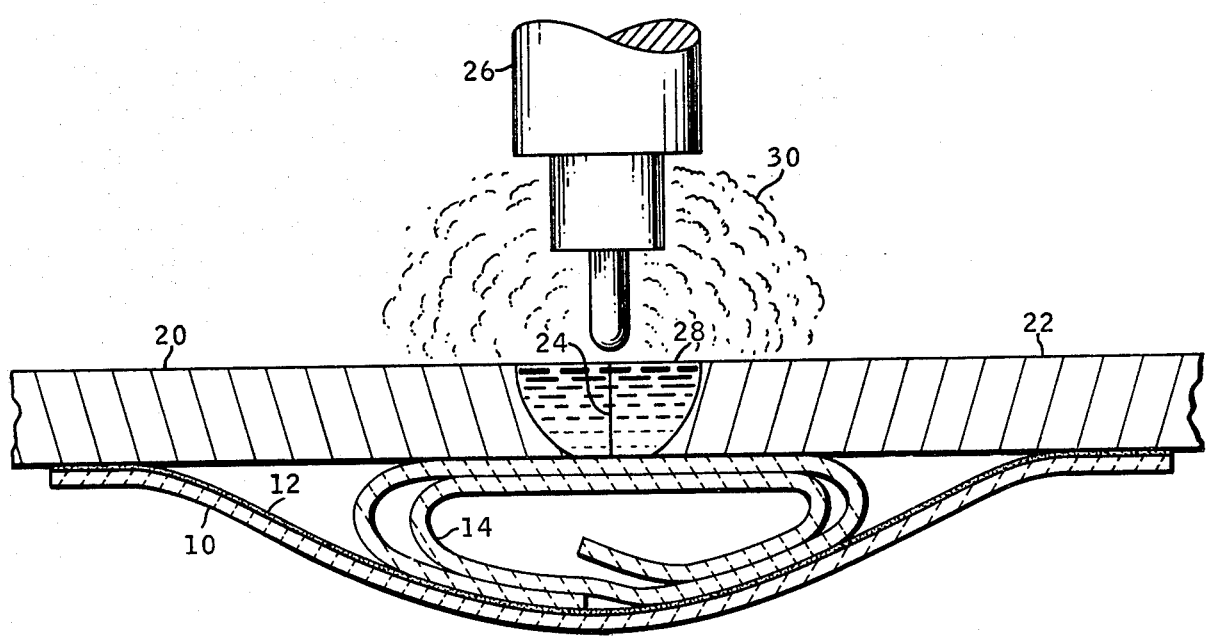
FIG. 2 is a schematic cross-section through the welding back-up tape in use during welding.

Use of the welding back-up tape of this invention is illustrated in FIG. 2, which shows a transverse section through the tape and a structure being welded.

Cover sheet 18, if any, is removed from an assembled back-up tape of suitable length. Adhesive layer 12 is activated, if necessary, and the tape is pressed against the structure (here, aluminum sheets 20 and 22). The adhesive along the margins of strip 10 removably bond the tape to sheets 20 and 22, holding roll 14 against the sheets along weld line 24. A conventional TIG (tungsten inert gas) welding heat 26 is moved along line 24, heating the edges of sheets 20 and 22 above the fusion temperature, forming a fused zone 28. A blanket of an inert gas 30 is maintained over the fused zone 28.

Roll 14 supports the underside of fused zone 28, preventing drop-through of molten metal. Since roll 14 is not degraded by the welding heat, no contamination of fused zone 28 can occur. As welding heat 26 passes on, fused zone 28 cools and solidifies, producing a bead having a slightly crowned upper bead and a desirable flat underbead.

In a typical case, roll 14 may have a circumference of about 2.36 inches and may comprise woven elevated temperature resistant glass fiber electrical insulating fabrics such as are available from the Varglas Corporation under the Volon A-172 and LV-153 designations. The roll is pressed against the pressure sensitive adhesive surface of a 2 inch wide aluminized woven glass fiber tape, such as that available from the Mystik Company under the 7455 designation.

The tape is typically aligned with the abutting edges of two 0.22 inch 2219 aluminum sheets and pressed thereagainst. The butt joint is welded with a conventional TIG welding machine. The resulting weld, made with no filler wire addition, has a flat underside bead and a slightly convex upper bead. There is no evidence of thinning, undercutting or other defects. Examination by X-ray shows no weld contamination. Tensile strength of the weld is found to be higher than welds made in a similar manner without the back-up tape.

While certain specific materials, configurations and arrangements are detailed in the above description of preferred embodiments, these may be varied, where suitable, with similar results.

Other applications, variations and ramifications of this invention will occur to those skilled in the art upon reading this disclosure. These are intended to be included within the scope of this invention as defined in the appended claims.

We claim:

1. A welding back-up tape comprising:
   an elongated narrow thin strip of flexible flat material;
   an adhesive coating on one surface of said strip;
   an elongated refractory fiber fabric sheet rolled about an axis parallel to the longer sides of said sheet;
   said roll having at least two fabric layers around the circumference of said roll and a hollow core;
   said roll being in bonding contact with said strip substantially along the centerline of said strip;
   whereby said roll and said strip may be pressed against a structure and held in place by said adhesive coating along the edges of said strip adjacent to said roll.

2. The welding back-up tape according to claim 1 wherein said strip comprises a woven refractory fiber fabric having a width of from about 1 to 3 inches.

3. The welding back-up tape according to claim 1 wherein the ratio of circumference of the outer surface of said roll to the width of said strip is from about 0.2 to about 1.0.

4. The welding back-up strip according to claim 1 wherein said adhesive coating is a pressure sensitive adhesive and said tape further includes a cover sheet having a surface treated to adhere to said adhesive but be easily releasable therefrom, said cover sheet having a width at least as great as the width of said strip, said cover sheet covering said roll and releasably bonded to said adhesive layer along the margins of said strip adjacent to said roll.

5. In a fusion welding system for butt welding aluminum structures comprising aluminum structures in close fitting contact along a weld line, a welding head on one side of said structures adapted to heat metal along said weld line to fusion temperature and a welding back-up assembly engaging the side of said structures opposite to said welding head and aligned with said weld line, the improvement wherein said welding back-up assembly comprises a strip of glass fiber fabric having an adhesive coating on one side, an elongated roll of glass fiber fabric, said roll partially flattened and bonded to said adhesive layer substantially along the centerline of said strip, said assembly pressed against said structures with said roll in contact with said weld line and said adhesive layer along the margins of said strip adjacent to said roll releasably bonding said assembly to said structures, said roll resisting significant degradation at the fusion temperature of aluminum.

6. The improvement according to claim 5 wherein said strip comprises a woven refractory fiber fabric having a width of from about 1 to 3 inches.

7. The improvement according to claim 5 wherein the ratio of circumference of the outer surface of said roll to the width of said strip is from about 0.2 to about 1.0.

8. A method for fabricating a welding back-up tape which comprises the steps of providing an elongated narrow strip of thin flat material;

coating one surface of said strip with an adhesive layer;

preparing a roll assembly by rolling an elongated refractory fiber fabric sheet about an axis parallel to the longer sheet edges until there are at least two fabric layers around the circumference of the roll;

placing said roll assembly along the approximate centerline of said strip;

partially flattening said roll assembly against said strip; said roll having a flattened width less than the width of said strip; and bonding said partially flattened roll to said strip by said adhesive.

9. The method according to claim 8 including the further step of providing an elongated cover sheet having a width at least as great as said strip, forming a coating on said cover sheet which will adhere to said adhesive but will easily release therefrom, and pressing said cover sheet to said strip over said roll whereby said cover sheet releasably adheres to said adhesive layer along the margins of said strip adjacent to said roll.

* * * * *